US011228226B2

(12) United States Patent
Favre et al.

(10) Patent No.: US 11,228,226 B2
(45) Date of Patent: Jan. 18, 2022

(54) ELECTRIC MACHINE COMPRISING A KNURLED ROTOR SHAFT AND METHOD OF MANUFACTURING SUCH A MACHINE

(71) Applicants: IFP Energies nouvelles, Rueil-Malmaison (FR); MAVEL S.r.l., Pont Saint Martin (IT)

(72) Inventors: Luca Favre, Valpelline (IT); Davide Bettoni, Settimo Vittone To Italy (IT); Wissam Dib, Suresnes (FR)

(73) Assignee: MAVEL EDT S.P.A., Pont Saint Martin (IT)

( * ) Notice: Subject to any disclaimer, the term of this patent is extended or adjusted under 35 U.S.C. 154(b) by 98 days.

(21) Appl. No.: 16/614,405

(22) PCT Filed: May 2, 2018

(86) PCT No.: PCT/EP2018/061154
§ 371 (c)(1),
(2) Date: Nov. 18, 2019

(87) PCT Pub. No.: WO2018/210561
PCT Pub. Date: Nov. 22, 2018

(65) Prior Publication Data
US 2020/0204035 A1 Jun. 25, 2020

(30) Foreign Application Priority Data
May 16, 2017 (FR) ........................................ 1754280

(51) Int. Cl.
*H02K 7/00* (2006.01)
*H02K 1/24* (2006.01)
(Continued)

(52) U.S. Cl.
CPC ............. *H02K 7/003* (2013.01); *H02K 1/246* (2013.01); *H02K 1/2766* (2013.01); *H02K 1/28* (2013.01); *H02K 19/02* (2013.01); *H02K 21/02* (2013.01)

(58) Field of Classification Search
CPC ...... H02K 7/003; H02K 1/246; H02K 1/2766; H02K 1/28; H02K 19/02; H02K 21/02; F16D 2001/103; F16D 1/072
(Continued)

(56) References Cited

U.S. PATENT DOCUMENTS 4,160,926 A 7/1979 Cope et al.
5,804,896 A 9/1998 Takehara et al.
(Continued)

FOREIGN PATENT DOCUMENTS

DE 102005059018 A1 6/2007
JP 08074871 * 3/1996 ............... F16D 1/06
(Continued)

OTHER PUBLICATIONS

International Search Report for PCT/EP2018/061154, dated Jul. 20, 2018; English translation submitted herewith (6 pages).
(Continued)

*Primary Examiner* — Terrance L Kenerly
(74) *Attorney, Agent, or Firm* — Fitch, Even, Tabin & Flannery LLP

(57) ABSTRACT

The present invention relates to an electrical machine comprising a rotor (10) and a stator, rotor (10) being formed by assembling a rotor body (4) and a rotor shaft (1). According to the invention, rotor shaft (1) is knurled and the outside diameter of rotor shaft (1) is greater than the inside diameter of rotor body (4), by a value ranging between 0.05 mm and 0.3 mm. The present invention further relates to a method of manufacturing such an electrical machine.

12 Claims, 2 Drawing Sheets

(51) Int. Cl.
    *H02K 1/27*     (2006.01)
    *H02K 1/28*     (2006.01)
    *H02K 19/02*     (2006.01)
    *H02K 21/02*     (2006.01)

(58) Field of Classification Search
    USPC .................................................. 310/40 R
    See application file for complete search history.

(56) References Cited

U.S. PATENT DOCUMENTS

| | | | |
|---|---|---|---|
| 5,910,056 A * | 6/1999 | Nagamoto | A63B 60/16 |
| | | | 473/305 |
| 2004/0150282 A1 | 8/2004 | Murakami et al. | |
| 2006/0043812 A1 | 3/2006 | Cheong et al. | |
| 2014/0246944 A1 | 9/2014 | Koka et al. | |
| 2015/0303749 A1 | 10/2015 | Okubo et al. | |
| 2015/0357869 A1 * | 12/2015 | Ikuta | H02K 9/22 |
| | | | 310/45 |

FOREIGN PATENT DOCUMENTS

| | | |
|---|---|---|
| JP | 2004-336965 A | 11/2004 |
| WO | 2013/072892 A2 | 5/2013 |
| WO | WO-2016188764 A1 * 12/2016 ............. H02K 1/274 |

OTHER PUBLICATIONS

U.S. Appl. No. 15/577,689, Final Office Action dated Jul. 28, 2021.

* cited by examiner

ELECTRIC MACHINE COMPRISING A KNURLED ROTOR SHAFT AND METHOD OF MANUFACTURING SUCH A MACHINE

CROSS REFERENCE TO RELATED APPLICATIONS

Reference is made to PCT/EP2018/061154 filed May 2, 2018, designating the United States, and French Application No. 17/54.280 filed May 16, 2017, which are incorporated herein by reference in their entirety.

BACKGROUND OF THE INVENTION

Field of the Invention

The present invention relates to an electrical machine and to a method of manufacturing this electrical machine. The invention relates to a magnet-assisted synchro-reluctant electrical machine.

Generally, an electric machine comprises a stationary part (stator) and a rotating part (rotor) coaxially arranged in one another.

Description of the Prior Art

The rotor has a rotor body fabricated from a bundle of laminations arranged on a rotor shaft. These laminations include housings for permanent magnets, and perforations for creating flux barriers allowing the magnetic flux of the magnets to be radially directed towards the stator.

This rotor is generally housed within a stator that carries electrical coils enabling generation of a magnetic field allowing the rotor to be rotated.

In order to fix the rotor shaft and the bundle of laminations making up the rotor body, the rotor shaft is conventionally inserted (fitted in) under load (using a press for example) into the rotor body. The outside diameter of the rotor shaft is therefore greater than the inside diameter of the rotor body. In order to enable a high torque transmission and a high rotational speed, the difference between these two diameters needs to be significant. However, this assembly under load and this diameter difference impose high mechanical stresses in the laminations making up the rotor body, which may generate significant deformations of these laminations, in particular at the magnetic bridges, which may modify the behavior of the electrical machine. Indeed, the magnetic bridges and the flux barriers may be deformed.

To overcome these drawbacks, the present invention relates to an electrical machine comprising a rotor and a stator with the rotor being formed by assembling a rotor body and a rotor shaft. According to the invention, the rotor shaft is knurled and the outside diameter of the rotor shaft is greater than the inside diameter of the rotor body, by a value ranging between 0.05 mm and 0.3 mm. The present invention further relates to a method of manufacturing such an electrical machine. Knurling of the rotor shaft provides good adhesion between the rotor shaft and the rotor body, which allows reduction of the difference between the diameters of the rotor shaft and the rotor body. Thus, the stresses within the laminations forming the rotor body are reduced.

SUMMARY OF THE INVENTION

The invention relates to an electrical machine comprising a rotor and a stator with the rotor having a rotor body fabricated from a bundle of laminations. The rotor body is fastened to a rotor shaft. The rotor shaft is knurled over at least a length which cooperates with the rotor body with the outside diameter of the rotor shaft being greater than the inside diameter of the rotor body by a dimension ranging between 0.05 mm and 0.3 mm.

According to an embodiment, the rotor shaft is knurled by straight knurling.

Advantageously, the ridges formed by knurling the rotor shaft are ground.

According to an implementation, the laminations are substantially circular laminations comprising orifices and/or magnets.

Preferably, the laminations are stacked and fixed together so as to form the rotor body.

According to a characteristic, the electrical machine is a variable-reluctance synchronous machine.

According to an embodiment option, the inside diameter of the rotor body is smooth.

Furthermore, the invention relates to a method of manufacturing an electrical machine comprising a rotor and a stator. For this method, the following steps are carried out:
 a) stacking laminations to form a rotor body;
 b) knurling a rotor shaft over at least a length intended to cooperate with the rotor body. The outside diameter of the rotor shaft is greater than the inside diameter of the rotor body by a dimension ranging between 0.05 mm and 0.3 mm,
 c) forming the rotor by fitting the rotor shaft into the rotor body, and d) positioning the rotor in the stator.

According to an embodiment of the invention, the rotor shaft is subjected to straight knurling.

Advantageously, the knurled surface of the rotor shaft is ground.

Preferably, the rotor shaft can be fitted into the rotor body using a press.

Furthermore, the method can comprise a preliminary step of inserting at least one magnet onto at least one of the laminations.

BRIEF DESCRIPTION OF THE DRAWINGS

Other features and advantages of the invention will be clear from reading the description hereafter, given by way of non limitative example, with reference to the accompanying figures wherein.

DETAILED DESCRIPTION OF THE INVENTION

Figure 1:
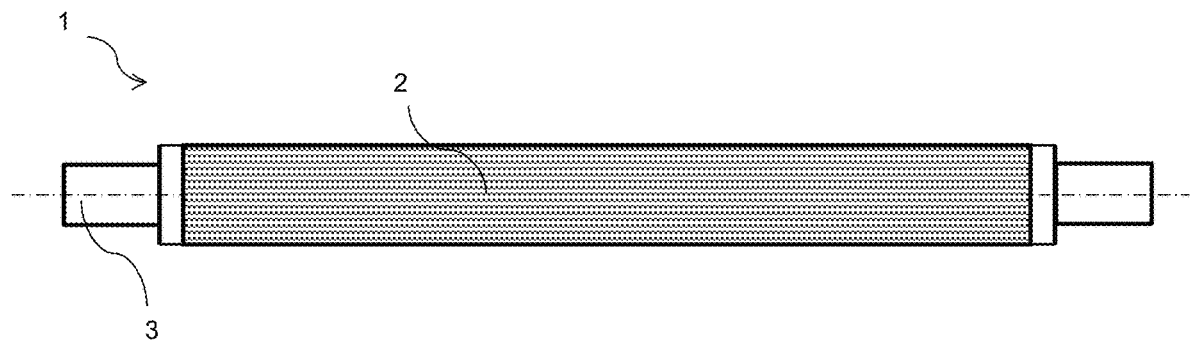
FIG. 1 illustrates a rotor shaft according to an embodiment of the invention.

The present invention relates to an electrical machine comprising a rotor and a stator. The rotor includes a rotor body, which is manufactured from of a bundle of laminations (a stack of metal sheets). The rotor also comprises a rotor shaft that is mounted on and fixed with the rotor body, the rotor shaft being inserted in a central bore of the rotor body.

According to the invention, the rotor shaft is knurled over at least a length intended to cooperate with the rotor body. Knurling is an operation that creates lines on a surface. Knurling allows the adhesion of the part to be improved. Knurling can be achieved using knurling tools brought into contact with the rotor shaft, or by constrained knurl rolling between two rollers or two racks. Furthermore, the outside diameter of the rotor shaft is greater than the inside diameter of the rotor body by a dimension ranging between 0.05 mm and 0.3 mm, preferably between 0.1 mm and 0.15 mm. This rotor design provides optimum fastening of the rotor shaft with the rotor body to transmit significant torques at high speeds. Thanks to the improved adhesion obtained by knurling and to the reduced diameter difference, the mechanical stresses within the laminations that make up the rotor body are reduced.

According to an embodiment of the invention, the knurl provided on the rotor shaft can be a straight knurl. A straight knurl is a knurl comprising lines only in the axial direction of the shaft. Thus, it is possible to optimize the adhesion and a fortiori the torque transmission between the rotor shaft and the rotor body. However, other lines can be created on the rotor shaft, inclined or crossed lines for example.

According to an embodiment of the invention, the knurling depth, i.e. the difference in height between the knurled grooves and ridges, ranges between 0.1 and 0.2 mm, and it can be substantially 0.15 mm. This value range allows adhesion to be optimized while limiting the deformation of the laminations forming the rotor body.

In order to control the rotor body and rotor shaft pressure interference, the ridges (tops) formed by knurling can be ground. After grinding, the ridges have a flat top. Grinding allows very tight tolerances to be met, which provides dimensions suited for torque transmission.

According to an implementation of the invention, the inside diameter of the rotor body can be smooth prior to inserting the rotor shaft. In other words, the inside diameter of the rotor body is not knurled. Indeed, cooperation of the rotor shaft knurl with the smooth bore of the rotor body allows sufficient adhesion for transmission of the necessary torque. However, once the rotor shaft is fixed in the rotor body, the rotor shaft knurl and the diameter difference create a deformation of the rotor body bore, by forming lines parallel to the lines of the rotor shaft knurl.

According to an embodiment option, the laminations forming the rotor body can be substantially circular laminations comprising orifices and/or permanent magnets. Thus, these laminations comprise housings for permanent magnets and perforations for creating flux barriers allowing the magnetic flux of the magnets to be radially directed towards the stator. The stator conventionally comprises at least one coil generating magnetic flux. These magnetic fluxes cause the rotation of the rotor.

According to an embodiment of the invention, and as is well known, the laminations forming the rotor body can be assembled together by matching the bores and the recesses by any known means, such as gluing, pressing, etc.

According to a characteristic of the invention, the rotor shaft can be made of steel.

Advantageously, the electrical machine can be of variable-reluctance synchronous type.

FIG. 1 schematically illustrates, by way of non-limitative example, a rotor shaft 1 according to an embodiment of the invention. Rotor shaft 1 comprises a knurled part 2, preferably made by deformation of the constituent material of the shaft. For the example of FIG. 1, the lines of knurl 2 are parallel to the axial direction of the rotor shaft (straight knurl). Conventionally, the rotor shaft comprises, at its ends 3, means fulfilling several functions: torque transmission, setting up of guide elements, etc.

Figures 2, 3:
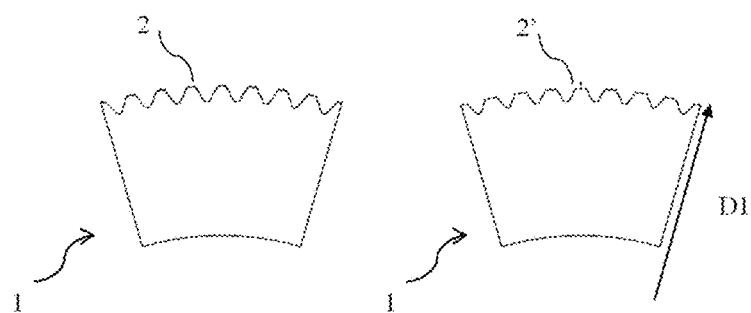
FIG. 2 illustrates a portion of a knurled rotor shaft according to an embodiment of the invention.
FIG. 3 illustrates a portion of a knurled and ground rotor shaft according to an embodiment of the invention.

FIG. 2 schematically illustrates, by way of non-limitative example, a portion of a rotor shaft 1 comprising a straight knurl 2. FIG. 2 is a cross-sectional view of rotor shaft 1.

FIG. 3 schematically illustrates, by way of non-limitative example, a portion of a rotor shaft 1 comprising a knurl 2' that has been ground. FIG. 3 is a cross-sectional view of rotor shaft 1. Rotor shaft 1 illustrated in this figure corresponds to rotor shaft 1 of FIG. 2 after a knurl grinding operation: the ridges formed during knurling have been ground so as to have a flat top. This figure also shows diameter D1, which is the outside diameter of rotor shaft 1, corresponding to the diameter of the ridges of knurl 2'.

Figures 4, 5:
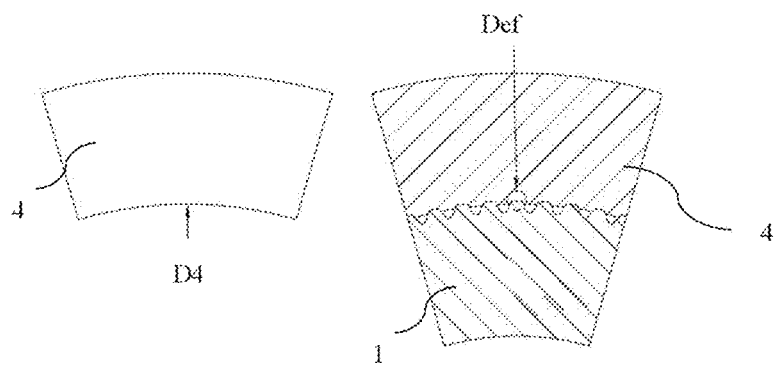
FIG. 4 illustrates a portion of the rotor body according to an embodiment of the invention.
FIG. 5 illustrates a portion of the assembly of the rotor shaft and the rotor body according to an embodiment of the invention.

FIG. 4 schematically illustrates, by way of non-limitative example, a portion of a rotor body 4 intended to cooperate with rotor shaft 1 illustrated in FIGS. 2 and 3. FIG. 4 is a cross-sectional view of the rotor body. This figure also shows diameter D4, which is the inside diameter of rotor body 4. The bore of the rotor body is smooth (that is not knurled). According to the invention, and in order to provide adhesion and torque transmission, diameter D1 is greater than diameter D4. Furthermore, the difference between diameters D1 and D4 ranges between 0.05 mm and 0.3 mm.

FIG. 5 schematically illustrates, by way of non-limitative example, the assembly of rotor shaft 1 of FIG. 3 with rotor body 4 of FIG. 4. FIG. 5 is a cross-sectional view of the rotor body and of the rotor shaft. Diameter D1 being greater than diameter D4, and due to the presence of the knurl, a local deformation Def appears in rotor body 4 at the inside diameter thereof.

Figure 6:
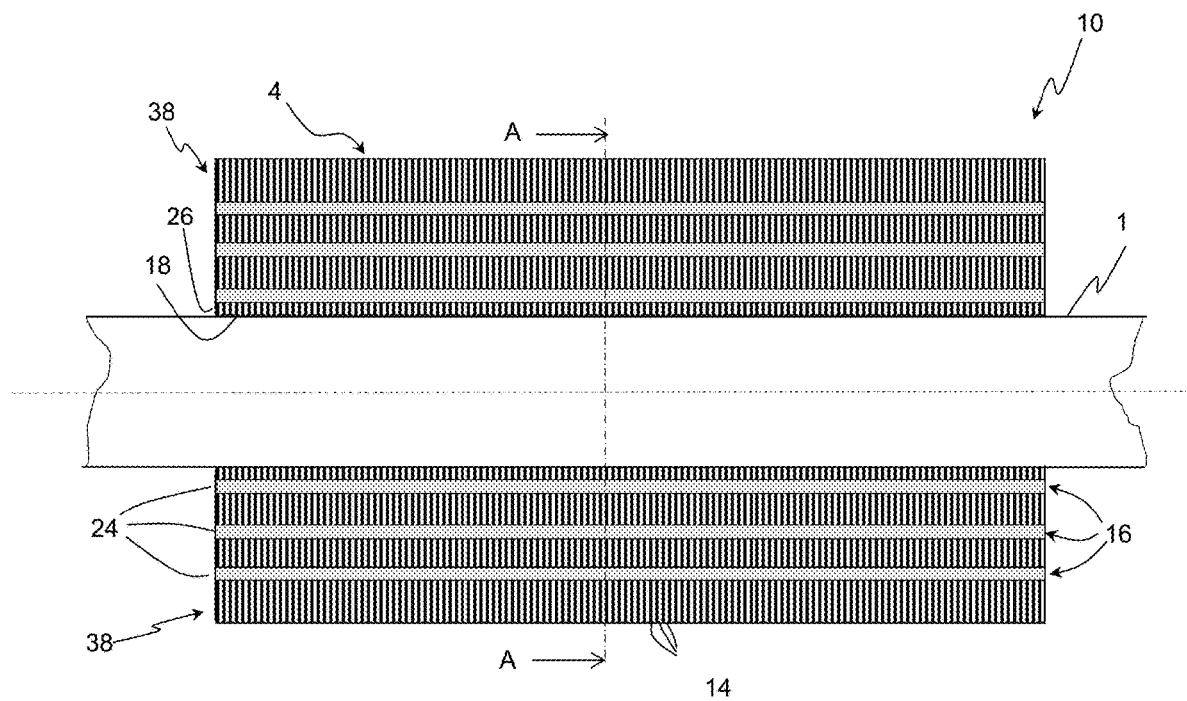
FIGS. 6 and 7 illustrate a cross-section of views respectively along axes BB and axes AA of a rotary electrical machine in accordance with the invention.
Figure 7:
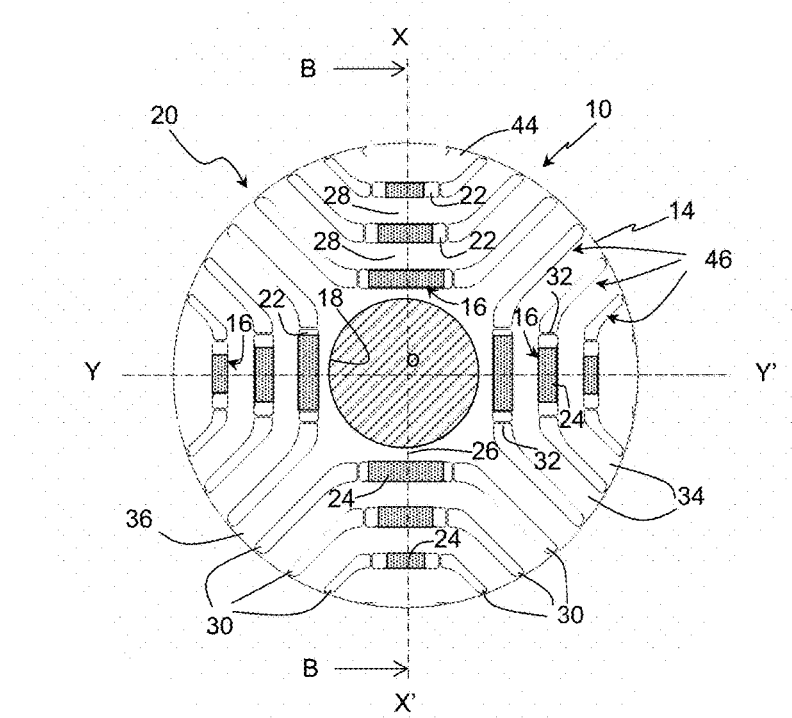

FIGS. 6 and 7 schematically illustrate, by way of non-limitative example, a rotary electrical machine comprising a stator (not shown) and a rotor 10. FIG. 6 is a cross-sectional view along axis BB (shown in FIG. 7), and FIG. 7 is a cross-sectional view along axis AA (shown in FIG. 6).

As illustrated in FIG. 6, the rotor 10 includes a knurled shaft 1 (the knurl is not shown), preferably magnetic, on which is arranged a bundle of identical plane ferromagnetic laminations 14 carrying a plurality of magnetic flux generators 16.

In connection with FIG. 7, circular laminations 14 are provided with a central bore 18 having rotor shaft 1 running therethrough and a plurality of axial recesses running right through laminations 14.

As is well known, the laminations are assembled together by matching the bores and the recesses using any known mechanism such as gluing, pressing, etc.

Thus assembled, the laminations form body 4 of rotor 10 which carries shaft 1 through central bores 18.

This configuration is more particularly applied to a variable-reluctance electrical machine as described in more detail hereafter.

In this configuration, the body comprises a first series of axial recesses housing magnetic flux generators and another series of axial recesses allowing magnetic flux barriers to be created.

The first series of recesses 22 has here (by way of non-limitative example) the shape of a quadrilateral, a rectangle in the present case. These recesses 22 receive the magnetic flux generators, here permanent magnets 24 in form of bars, also rectangular and of length substantially equal to the length of the body. These recesses are referred to as "housings" in the rest of the description.

These housings 22 are arranged radially one above the other and at a distance from one another from the center O of bore 18.

As is more visible in FIG. 7, these rectangular housings 22 are distributed along axes XX' and YY' that are substantially orthogonal and pass through center O.

In the example of FIG. 7, each semiaxis (OX, OX'; OY, OY') carries three axial housings 22 whose sides of greater length are perpendicular to the semiaxes and whose side dimensions decrease from center O to the periphery of the bundle of laminations. Similarly, the height of these housings decreases from center O to this periphery.

The housing 22 closest to bore 18 leaves a bridge of material 26 with this bore and a bridge of material 28 remains between each housing.

The housing 22 furthest from bore 18 is arranged at a distance from the peripheral edge of the body.

The other series of recesses are perforations 30 of substantially constant height and inclined in a radial direction, which start at the housings 22 and extend to the vicinity of the edge of the laminations.

These perforations start at the lateral edge 32 of housings 22 and they rise at an angle relative to a line parallel to housings 22 so as to reach this vicinity.

As shown in FIG. 6, the inclined perforations are arranged symmetrically with respect to the housings. More precisely, a series of three inclined perforations is provided on one side of the semiaxis and another series of three inclined perforations is provided on the other side of this semiaxis.

A substantially V-shaped flat-bottomed geometrical figure, with the flat bottom formed by housing 22 and with the inclined legs of the V formed by perforations 30, is thus formed each time. Three superposed V shapes are spaced at a distance from one another and have height and width dimensions decreasing from the bore to the periphery of the body are thus obtained on each semiaxis.

Thus, besides bridges of material 26, 28, a solid part 34 remains between the inclined perforations of each V shape, as well as a solid part 36 between the perforation closest to the bore of a series of three V shapes and the perforation closest to the bore of a neighboring series of V shapes.

Flux barriers 46 formed by the perforations are thus created. The magnetic flux from the magnets then cannot but transit through the bridges of material and the solid parts.

Furthermore, the present invention relates to a method of manufacturing an electrical machine. The electrical machine comprises a rotor and a stator. The method according to the invention comprises the following steps:

a) stacking and preferably fixing laminations to form a rotor body;

b) knurling a rotor shaft over at least a length intended to cooperate with the rotor body. The outside diameter of the rotor shaft is greater than the inside diameter of the rotor body by a dimension ranging between 0.05 mm and 0.3 mm;

c) forming the rotor by fitting the rotor shaft into the rotor body; and d) positioning the rotor in the stator.

Steps a) and b) can be carried out in this order, simultaneously or in the opposite order.

The manufacturing method can be designed for manufacturing the electrical machine according to one of the embodiments described above.

The laminations used for step a) of the method can be similar to the lamination illustrated in FIG. 7. The lamination can notably be intended to receive a permanent magnet.

In this case, the method can comprise a preliminary step (before stacking the laminations) of inserting at least one permanent magnet on at least one of the laminations.

The rotor shaft obtained after step b) can be similar to the rotor shaft illustrated in FIGS. 1 to 3.

Step c) can allows achieving an embodiment as illustrated in FIGS. 5 and 6.

Advantageously, knurling of the rotor shaft is performed by deforming the constituent material of the rotor shaft. For example, knurling can be achieved using knurling tools brought into contact with the rotor shaft, or by constrained knurl rolling between two rollers or two racks.

According to an embodiment of the invention, the rotor shaft can be provided with a straight knurl. It is thus possible to optimize adhesion and a fortiori torque transmission between the rotor shaft and the rotor body. However, other lines can be created on the rotor shaft, inclined or crossed lines for example.

According to an embodiment of the invention, a step of grinding the knurled surface of the rotor shaft can be carried out. Thus, the ridges (tops) formed by knurling can be ground. Grinding allows meeting very tight tolerances, which provides dimensions suited for torque transmission.

In order to ensure fixing of the rotor shaft with the rotor body, fitting in can be performed using a press. The force applied by the press can be determined notably according to the diameters of the rotor shaft and of the rotor body.

The invention claimed is:

1. An electrical machine comprising:
a rotor and a stator, the rotor including a body formed with a stack of laminations and which is fixed on a knurled shaft, the shaft being knurled over at least a length cooperating with the body and including an outside diameter of the shaft interfering with an inside diameter of a rotor bore in the body; and wherein
the body includes a series of axial recesses which house magnetic flux generators with the recesses disposed closest to the shaft each housing a magnetic flux generator; and
a material bridge extending between each recess disposed closest to the shaft housing a magnetic flux generator and an outside surface of the knurled shaft; and wherein
the outside diameter of the knurled shaft is greater than an inside diameter of the body by a dimension ranging from 0.015 mm and 0.3 mm and the knurling has flat ground ridges in lines on the outside diameter of the shaft and the inside diameter of the body is smooth, and engages the flat round ridges which deform the inside diameter of the rotor bore to form lines which are parallel to the flat ground ridges.

2. A machine as claimed in claim 1, wherein the rotor shaft comprises straight knurling.

3. A machine as claimed in claim 1, wherein the laminations are circular and comprise the axial recess which include magnets.

4. A machine as claimed in claim 1, wherein the laminations are stacked and fixed together to form the rotor body.

5. A machine as claimed in claim 1, wherein the electrical machine is a variable reluctance synchronous machine.

6. A method of manufacturing an electrical machine comprising a rotor and a stator, comprising:
a) stacking laminations to form a rotor body including axial recesses which house magnetic flux generators, the axial recesses which are disposed closest to an inside diameter of the rotor house magnetic flux generators spaced from an inside diameter of the rotor body by a material bridge;

b) knurling a rotor shaft over at least a length which cooperates with the rotor body with an outside diameter of the rotor shaft being greater than a smooth inside body of the rotor body by a dimension ranging between 0.05 mm and 0.3 mm;

c) fitting the rotor shaft into the smooth inside body to form an interference fit;

d) grinding an exterior knurled surface of the rotor shaft to have flat tops which are the outside diameter of the rotor shaft;

e) positioning the ground exterior surface of the rotor shaft with flat tops within the inside diameter of the rotor body so that the flat tops of the rotor shaft engage the smooth surface by the interference fit with the rotor shaft to deform an inside diameter of a rotor bore to forming lines parallel to the flat tops of the knurling; and f) positioning the rotor in the stator.

7. A method as claimed in claim 6, comprising forming the rotor shaft with the exterior surface comprising straight knurling.

8. A method as claimed in claim 6, comprising press fitting the rotor shaft into the interference fit with the rotor body.

9. A method as claimed in claim 7, comprising press fitting the rotor shaft into the interference fit with the rotor body.

10. A method as claimed in claim 6, comprising at least one magnet is placed into at least one of the recesses.

11. A method as claimed in claim 7, comprising placing at least one magnet into at least one of the recesses.

12. A method as claimed in claim 8, comprising placing at least one magnet into at least one of the recesses.

* * * * *